United States Patent
Watanabe

(10) Patent No.: US 9,848,267 B2
(45) Date of Patent: Dec. 19, 2017

(54) ELECTRONIC APPARATUS

(71) Applicant: KYOCERA Corporation, Kyoto (JP)

(72) Inventor: Takaaki Watanabe, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 23 days.

(21) Appl. No.: 14/915,820

(22) PCT Filed: Sep. 1, 2014

(86) PCT No.: PCT/JP2014/004477
§ 371 (c)(1),
(2) Date: Mar. 1, 2016

(87) PCT Pub. No.: WO2015/033548
PCT Pub. Date: Mar. 12, 2015

(65) Prior Publication Data
US 2016/0198268 A1    Jul. 7, 2016

(30) Foreign Application Priority Data

Sep. 3, 2013 (JP) ................................ 2013-182415

(51) Int. Cl.
*H04R 1/02* (2006.01)
*H04R 17/00* (2006.01)
(Continued)

(52) U.S. Cl.
CPC .......... *H04R 17/00* (2013.01); *H04M 1/0266* (2013.01); *H04M 1/0268* (2013.01);
(Continued)

(58) Field of Classification Search
CPC .......... H04R 1/02; H04R 1/025; H04R 1/026; H04R 2217/00–2217/03
(Continued)

(56) References Cited

U.S. PATENT DOCUMENTS 7,050,600 B2 * 5/2006 Saiki ................... H04M 1/03
381/186
7,583,811 B2 * 9/2009 Wada .................. H04R 1/025
381/190
(Continued)

FOREIGN PATENT DOCUMENTS

JP    H8-006134 A    1/1996
JP    2002-108238 A    4/2002
(Continued)

OTHER PUBLICATIONS

International Search Report of PCT/JP2014/004477 dated Oct. 7, 2014.
(Continued)

*Primary Examiner* — Suhan Ni
(74) *Attorney, Agent, or Firm* — Studebaker & Brackett PC

(57) ABSTRACT

An electronic apparatus 1 having a panel 10, a housing 60 for supporting the panel 10, and a piezoelectric element unit 30 attached to the panel 10, the panel 10 becomes bent by the piezoelectric element unit 30 in such a manner that a region of the panel 10 immediately above the piezoelectric element unit 30 in a longitudinal direction thereof is raised higher than a surrounding region, and thus a part of the human body in contact with the panel 10 vibrates and delivers a sound, wherein the panel 10 is attached to the housing 60 by a double-sided adhesive tape 70 provided along a periphery of the panel 10 and an adhesive 71 applied along the double-sided adhesive tape 70.

6 Claims, 6 Drawing Sheets

(51) Int. Cl.
*H04M 1/02* (2006.01)
*H04M 1/03* (2006.01)

(52) U.S. Cl.
CPC ........... *H04M 1/03* (2013.01); *H04R 2460/13* (2013.01); *H04R 2499/11* (2013.01)

(58) Field of Classification Search
USPC ................................................ 381/388, 190
See application file for complete search history.

(56) References Cited

U.S. PATENT DOCUMENTS

| | | |
|---|---|---|
| 9,042,593 B2 | 5/2015 | Matsunaga et al. |
| 9,070,864 B2 | 6/2015 | Hayashi et al. |
| 2009/0103767 A1* | 4/2009 | Kuroda .................... H04R 1/02 381/388 |
| 2013/0259274 A1 | 10/2013 | Hayashi et al. |
| 2014/0355811 A1 | 12/2014 | Matsunaga et al. |

FOREIGN PATENT DOCUMENTS

| | | |
|---|---|---|
| JP | 2005-348193 A | 12/2005 |
| JP | 2013-143605 A | 7/2013 |
| JP | 2013/046909 A1 | 10/2014 |

OTHER PUBLICATIONS

Written Opinion of PCT/JP2014/004477 dated Oct. 7, 2014 with Concise Explanation.

* cited by examiner

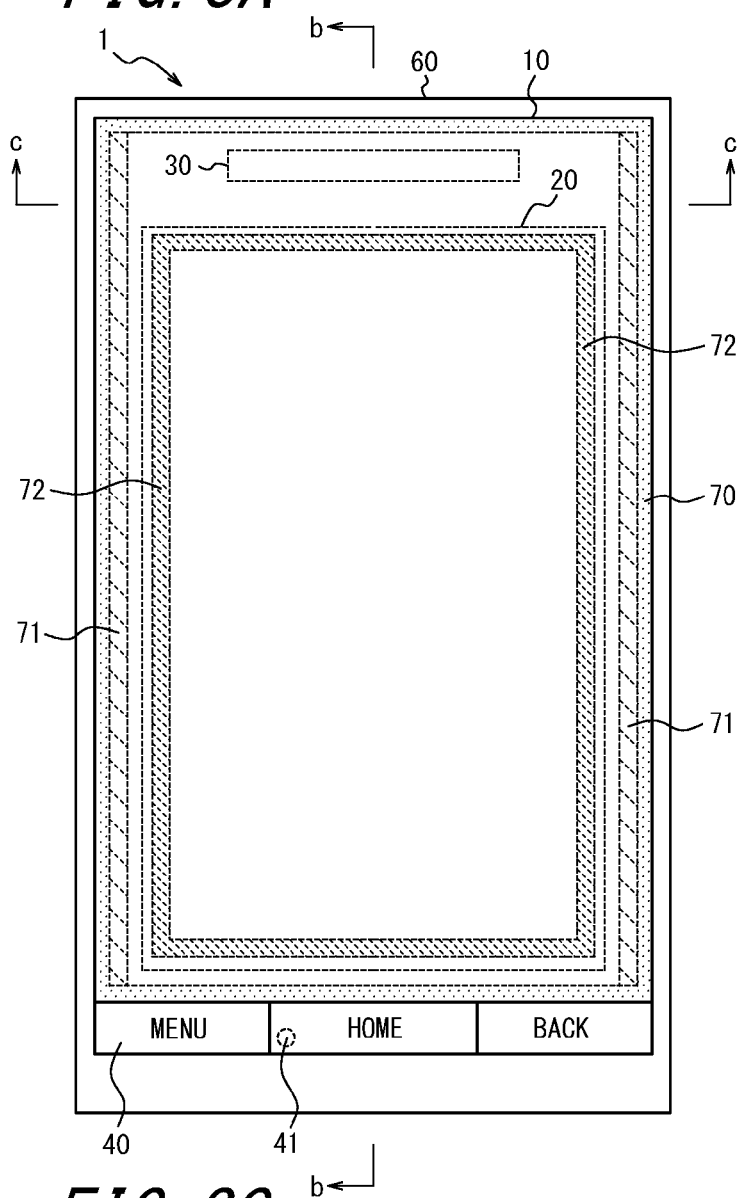
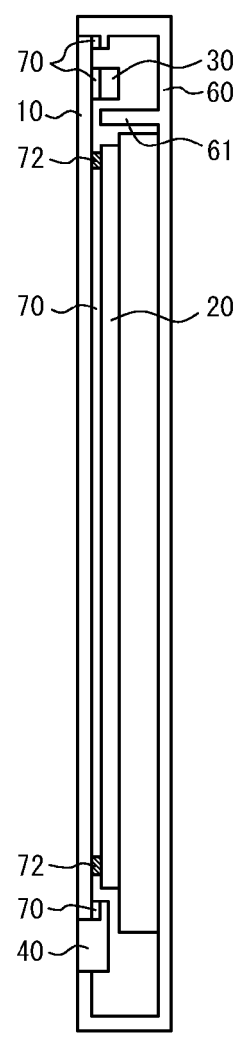
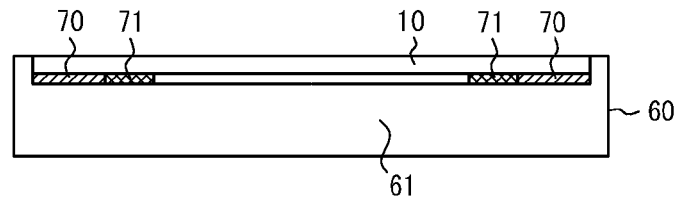
FIG. 3A
FIG. 3B
FIG. 3C

ELECTRONIC APPARATUS

CROSS REFERENCE TO RELATED APPLICATION

This application claims priority to and the benefit of Japanese Patent Application No. 2013-182415 filed on Sep. 3, 2013, the entire contents of which are incorporated herein by reference.

TECHNICAL FIELD

This disclosure relates to an electronic apparatus for delivering a sound based on vibration of a vibrator to a user when the vibrator retained in a housing is pressed against the human ear.

BACKGROUND

PLT 1 set forth below describes an electronic apparatus such as a mobile phone that delivers an air conduction sound and a bone conduction sound to a user. The PLT 1 also describes that the air conduction sound is a sound that is delivered to the auditory nerve of the user when vibration of the air caused by vibration of an object reaches the eardrum through the ear canal and vibrates the eardrum. The PLT 1 further describes that the bone conduction sound is a sound that is delivered to the auditory nerve of the user via a part of a user's body (for example, the cartilage of the ear) in contact with the object being vibrating.

In the phone described in the PLT 1, a vibrator in the form of a short rectangular plate constituted by using a piezoelectric bimorph and a flexible material is attached to an outer surface of a housing via an elastic member. The PLT 1 also describes that, upon application of a voltage to the piezoelectric bimorph of the vibrator, a piezoelectric material stretches and contracts in a longitudinal direction causing the vibrator to vibrate in a bending manner and, when the user brings the vibrator into contact with the auricle, the air conduction sound and the bone conduction sound are delivered to the user.

CITATION LIST

Patent Literature

PLT 1: JP-A-2005-348193

SUMMARY

Technical Problem

As described in the PLT 1, the electronic apparatus for delivering the air conduction sound and the bone conduction sound via the cartilage of the ear does not employ a structure in which the housing and a panel serving as a vibration plate are attached together by a double-sided adhesive tape. Therefore, there is no consideration in the PLT 1 about various problems of an electronic apparatus in which the housing and the panel serving as the vibration plate are attached together by using the double-sided adhesive tape.

Solution to Problem

An electronic apparatus according to the disclosure herein having a panel, a housing for supporting the panel, and a piezoelectric element unit attached to the panel, the panel becomes bent by the piezoelectric element unit in such a manner that a region of the panel immediately above the piezoelectric element unit in a longitudinal direction thereof is raised higher than a surrounding region, and thus a part of the human body in contact with the panel vibrates and delivers a sound, wherein the panel is attached to the housing by a double-sided adhesive tape provided along a periphery of the panel and an adhesive applied along the double-sided adhesive tape.

Advantageous Effect

According to the disclosure herein, an electronic apparatus having a vibrator that functions in an excellent manner may be provided.

BRIEF DESCRIPTION OF THE DRAWINGS

In the accompanying drawings:

FIG. 3A is an elevation view schematically illustrating a main section of an implementing structure of the electronic apparatus of FIG. 1;

FIG. 3B is a cross-sectional view taken along the line b-b of FIG. 3A;

FIG. 3C is a cross-sectional view taken along the line c-c of FIG. 3A;

DETAILED DESCRIPTION

Figure 1:
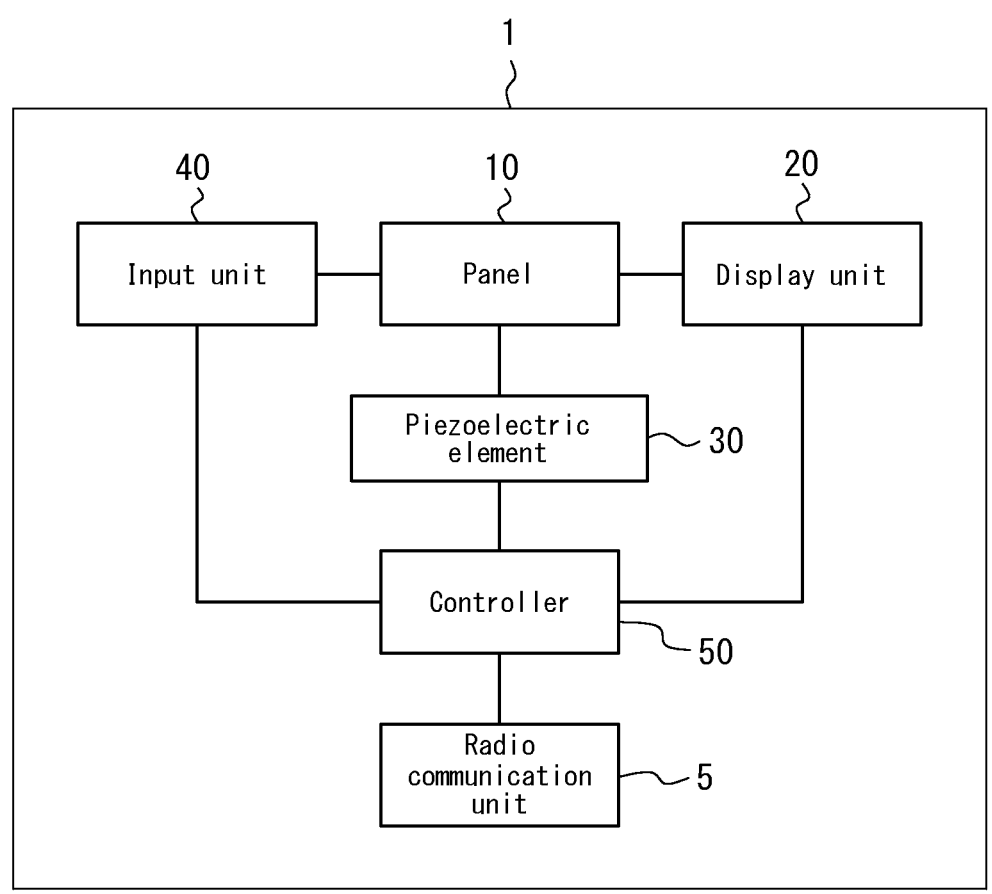
FIG. 1 is a diagram illustrating a functional block of a main section of an electronic apparatus according to one embodiment.

Hereinafter, an embodiment of the disclosure will be described in detail with reference to the accompanying drawings. FIG. 1 is a diagram illustrating a functional block of a main section of an electronic apparatus 1 according to one embodiment. The electronic apparatus 1 is, for example, a mobile phone terminal and includes a radio communication unit 5, a panel 10, a display unit 20, a piezoelectric element (a piezoelectric element unit) 30, an input unit 40, and a controller 50. The radio communication unit 5 has a known configuration and is wirelessly connected to communication network via a base station and the like.

The panel 10 constitutes a vibration plate and may be accompanied by a touch panel for detecting a contact, or may be a cover panel or the like for protecting the display unit 20. The panel 10 is made of, for example, glass or synthetic resin such as acrylic and the like. The panel 10 preferably has a plate-like shape. The panel 10 may be a flat plate or a curved panel with a gently sloped surface. The panel 10 serving as the touch panel detects a contact by a user's finger, a pen, a stylus pen, and the like. A detection method of the touch panel may be any one of an electrostatic capacitance method, a resistance film method, a surface acoustic wave method (or an ultrasound method), an infrared method, an electromagnetic induction method, a load detection method, and the like.

As illustrated in FIG. 3A to FIG. 3C, the display unit 20 is a display device such as a liquid crystal display, an organic EL display, an inorganic EL display, or the like. The display unit 20 is disposed on a rear side of the panel 10. For example, the display unit 20 is disposed being spaced apart from the panel 10 in a housing 60 of the electronic apparatus 1 or disposed on a circuit board inside the housing 60.

The piezoelectric element 30 is an element that, upon application of an electrical signal (a voltage) thereto, stretches and contracts, or curves, in accordance with an electromechanical coupling coefficient of a constituent material. The piezoelectric element may be made of, for example, ceramic or crystal. The piezoelectric element 30 may be a unimorph, a bimorph, or a laminated piezoelectric element. The laminated piezoelectric element includes a laminated bimorph element including laminated bimorphs (for example, 16 to 72 layers thereof). The laminated piezoelectric element has a multilayer structure including a plurality of dielectric layers made of, for example, PZT (lead zirconate titanate) and electrode layers disposed therebetween. The unimorph stretches and contracts upon application of the electrical signal (the voltage), and the bimorph curves upon application of the electrical signal (the voltage).

The piezoelectric element 30 is disposed, for example, on a rear surface of the panel 10 (a surface inside the electronic apparatus 1). The piezoelectric element 30 is attached to the panel 10 by a joint member (for example, a double-sided adhesive tape 70). The piezoelectric element 30 may be attached to the panel 10 via an intermediate member (for example, sheet metal). The piezoelectric element 30 is disposed on the rear surface of the panel 10 and spaced apart from an internal surface of the housing 60 by a predetermined distance. The piezoelectric element 30 is preferably spaced apart from the internal surface of the housing 60 by the predetermined distance also when stretching and contracting, or curving. That is, the distance between the piezoelectric element 30 and the internal surface of the housing 60 is preferably greater than a maximum deformation amount of the piezoelectric element 30.

The input unit 40 receives an input operation from a user and is constituted by using, for example, an operation button (an operation key). When the panel 10 serves as the touch panel, the panel 10 may also receive the input operation from the user by detecting the input operation of the user.

The controller 50 is a processor for controlling the electronic apparatus 1. The controller 50 applies a predetermined electrical signal (a voltage corresponding to an audio signal) to the piezoelectric element 30. The voltage applied to the piezoelectric element 30 by the controller 50 may be, for example, ±15 $V_{p-p}$. Thereby, even when the user presses the panel 10 against a user's body applying force of, for example, 3 N or greater (force of 5 N to 10 N), the panel 10 may generate sufficient vibration allowing generation of a human body vibration sound via a part of the user's body. Note that a level of the voltage to apply may be appropriately adjusted based on fixing strength of the panel 10 to the housing or a support member, or based on performance of the piezoelectric element 30.

When the controller 50 applies the electrical signal to the piezoelectric element 30, the piezoelectric element 30 stretches and contracts, or curves, in a longitudinal direction. At this time, the panel 10 having the piezoelectric element 30 attached thereto is deformed following the stretch and contraction, or curve, of the piezoelectric element 30 and vibrates. Thereby, the panel 10 generates an air conduction sound and also, when the user brings the panel 10 into contact with a part of the user's body (for example, the cartilage of the external ear), generates the human body vibration sound via the part of the user's body. For example, the controller 50 may control to apply an electrical signal corresponding to a sound signal of voice of the other party of a call to the piezoelectric element 30 so as to generate the air conduction sound and the human body vibration sound corresponding to the sound signal. The audio signal may be a ringtone, or music including songs. Also, the electronic signal applied to the piezoelectric element 30 may be based on music data stored in an internal storage of the electronic apparatus 1, or music data stored in an external server and the like to be reproduced via the network.

The panel 10 vibrates in an attaching region having the piezoelectric element 30 attached thereto, as well as in a region remote from the attaching region. The panel 10, in the regions to vibrate, includes a plurality of positions for vibrating in a direction intersecting with a main surface of the panel 10, at each of which a value of vibration amplitude changes with time from positive to negative or vice versa. The panel 10, at a certain moment, vibrates in such a manner that regions with relatively large vibration amplitude and regions with relatively small vibration amplitude are seemingly distributed in a random manner in a substantially entire panel 10. That is, over the entire panel 10, vibrations of a plurality of waves are detected.

When the piezoelectric element 30 itself is attached to the panel 10 in the manner as described above, since the curve of the piezoelectric element 30 causes deformation thereof in direct response to the curve of the panel 10, there is an advantage that the vibration becomes less attenuated, unlike an excitation method of a piezoelectric actuator that moves the piezoelectric element in a manner similar to a pendulum such that vibration is indirectly delivered from a support portion of the pendulum to the panel. That is, the panel 10 is bent by the piezoelectric element 30 such that a region of the panel 10 is raised higher in the longitudinal direction of the piezoelectric element 30 than a surrounding region. Thereby, the part of the human body in contact with the panel 10 vibrates and thus delivers the sound. Therefore, unlike a panel speaker, when the panel is pressed against the human body applying a predetermined pressure or more, the vibration becomes less attenuated, and the sound is satisfactorily delivered by the vibration. Therefore, preferably, the piezoelectric element 30 is directly attached to the panel 10. Here, the direct attachment includes attaching the piezoelectric element 30 and the panel 10 together via a Lenny material serving as the double-sided adhesive tape or other reinforcing members, or via a rubber material serving as a shock absorber.

Figure 2:
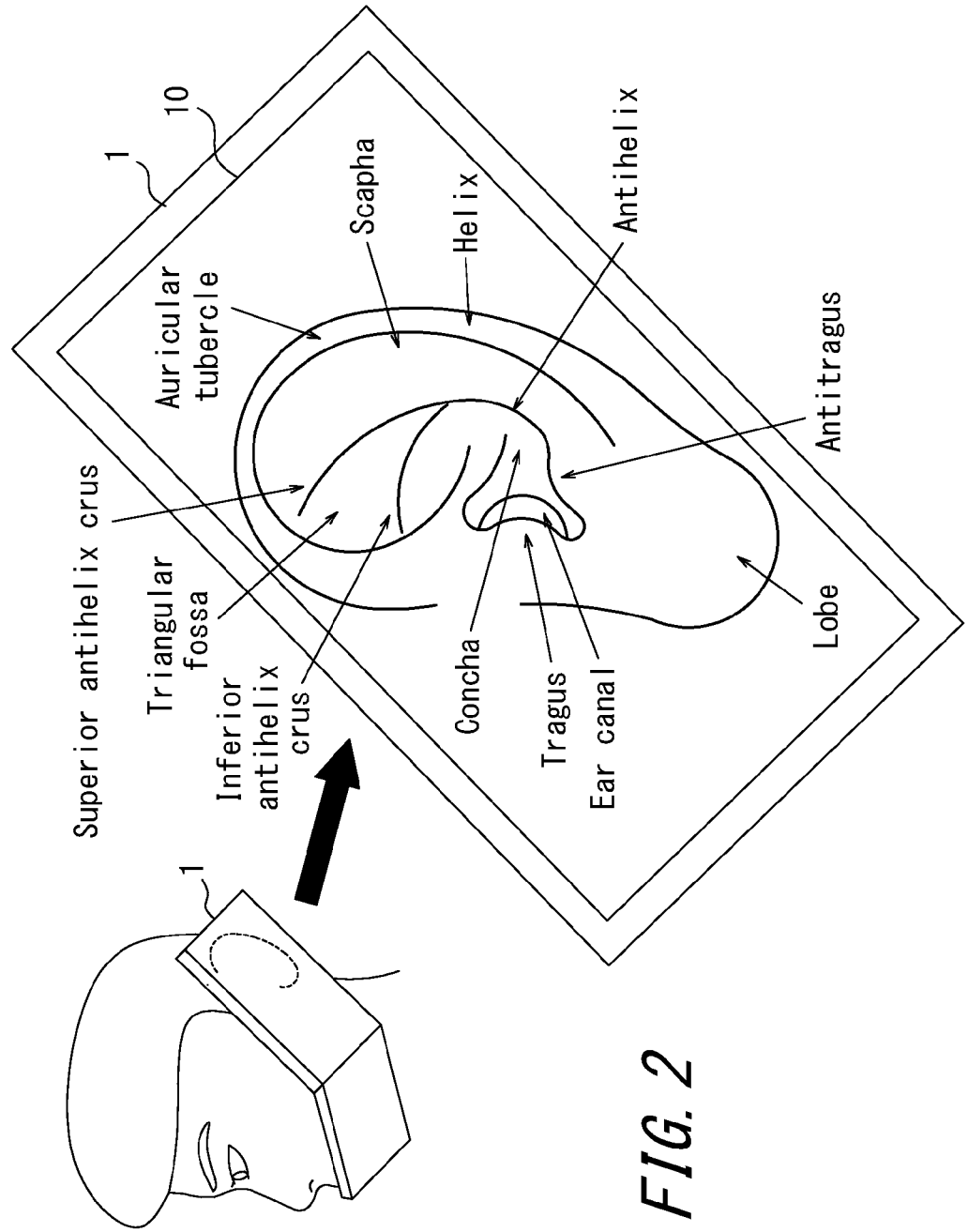
FIG. 2 is a diagram illustrating a preferred shape of a panel.

Here, the panel 10 may be in size approximately similar to the user's ear. Or, as illustrated in FIG. 2, the panel 10 may be larger than the user's ear. In this case, when the user listens to the sound, since the entire ear is likely to be covered by the panel 10 of the electronic apparatus 1, less ambient sounds (noises) may enter the ear canal. The panel 10 may preferably vibrate in a region larger than a region having a length corresponding to a distance from the inferior antihelix crus (the lower antihelix crus) to the antitragus and a width corresponding to a distance from the tragus and the antihelix. Preferably, the panel 10 vibrates in a region having a length corresponding to a distance from an area in the vicinity of the superior antihelix crus (the upper antihelix crus) of the helix to the lobe and a width corresponding to a distance from the tragus to an area in the vicinity of the antihelix of the helix. The region having the length and the width as described above may be in a rectangular shape, or in an oval shape having the above length as a long diameter and the above width as a short diameter. For an average ear size of Japanese people, refer to Database of Japanese Body Size (1992-1994) provided by Research Institute of Human Engineering for Quality Life (HQL). When the panel 10 is equal to or larger than the average ear size of Japanese people, it is considered that the panel 10 may cover most of foreign nationals' entire ears.

The electronic apparatus 1 described above, by vibrating the panel 10, may deliver the air conduction sound and the human body vibration sound, which is delivered via a part of the user's body (for example, the cartilage of the outer ear), to the user. Therefore, when sound at a volume similar to that of a conventional dynamic receiver is output, less sound is transmitted around the electronic apparatus 1 through the vibration of the air caused by the vibration of the panel 10 as compared with that of the dynamic receiver. Accordingly, the electronic apparatus 1 is suitable for listening to, for example, a recorded message on a train or the like.

Since the electronic apparatus 1 described above delivers the human body vibration sound by vibrating the panel 10, when the user is wearing, for example, earphones or headphones, the user may hear the sound via the earphones or the headphones and a part of the user's body by bringing the electronic apparatus 1 into contact with the earphones or the headphones.

The electronic apparatus 1 described above delivers the sound to the user by vibrating the panel. Therefore, when the electronic apparatus 1 does not separately include the dynamic receiver, an opening (a sound opening) for voice transmission does not need to be formed on the housing, allowing simplification of a waterproof structure of the electronic apparatus 1. Note that, when the electronic apparatus 1 has the dynamic receiver, the sound opening is preferably sealed with a material that ventilates while blocking liquid. Such a material for ventilating while blocking liquid is, for example, Gore-Tex (registered trademark).

FIGS. 3A to 3C are diagrams schematically illustrating a main section of an implementing structure of the electronic apparatus 1 according to one embodiment. FIG. 3A is an elevation view, and FIG. 3B is a cross-sectional view taken along the line b-b of FIG. 3A. FIG. 3C is a cross-sectional view taken along the line c-c of FIG. 3A. The electronic apparatus 1 illustrated in FIGS. 3A to 3C is a mobile phone, a tablet, a smartphone or the like having the panel 10 serving as a protective panel formed with an acrylic plate or a glass plate disposed on a front side of the housing 60 (for example, a metal or resin casing). The panel 10 and the input unit 40 are supported by the housing 60, and the display unit 20 is supported on an upper surface of the circuit board disposed in the housing 60. The piezoelectric element 30 is attached to the rear surface of the panel 10 by the double-sided adhesive tape 70. The panel 10, the display unit 20, and the piezoelectric element 30 have a substantially rectangular shape.

The display unit 20 is arranged at an approximate center of a lateral direction of the panel 10. The piezoelectric element 30 is arranged at a position spaced apart from one end (top) in the longitudinal direction of the panel 10 by a predetermined distance near the top, in such a manner that a longitudinal direction of the piezoelectric element 30 becomes parallel to the lateral direction of the panel 10. Or, the piezoelectric element 30 may be provided at a corner of the panel. The display unit 20 and the piezoelectric element 30 are arranged side by side on the rear surface of the panel 10. The input unit 40 is supported by the housing 60 at the other end (bottom) in the longitudinal direction of the panel 10. The input unit 40, as indicated by the broken lines, has a mouthpiece 41 with a microphone formed therein. That is, the housing 60 in a rectangular shape has an upper portion with the piezoelectric element 30 arranged therein and a lower portion with the mouthpiece 41 formed therein.

The user, in order to hear the sound from the electronic apparatus 1, brings the panel 10 into contact with, for example, the ear. Hereinafter, a region of the panel 10 that is assumed to come into contact with a part of the human body (e.g., the ear) is referred to as a contact region. The panel 10 needs to vibrate at least in the contact region. The contact region may partially overlap with a mounting region of the panel 10 having the piezoelectric element 30 mounted therein. Or, the contact region may include the entire mounting region.

The panel 10, as illustrated in FIG. 3A, is attached to the housing 60 by the double-sided adhesive tape 70 provided along a periphery of the panel 10 in a manner making a circuit. Inside the double-sided adhesive tape 70, an adhesive 71 is applied therealong so as to attach the panel 10 and the housing 60 together. Thereby, attaching strength the double-sided adhesive tape 70 alone cannot achieve may be obtained, and the piezoelectric element 30 is less likely to break when falling and the like. Especially when the electronic apparatus falls, a large vibration tends to be delivered along the longitudinal direction of the panel 10. Therefore, when the large vibration causes breakage of the piezoelectric element 30, the adhesive 71 is preferably applied in addition to the double-sided adhesive tape 70 at least along the longitudinal direction of the panel 10. In the lateral direction of the panel 10, in order to prevent from excessively suppressing the vibration generated by the piezoelectric element 30, application of the adhesive 71 may be avoided. However, when adhesiveness of the adhesive 71 is not strong enough, the adhesive 71 may be applied along lateral sides of the panel 10. In this case, the adhesive 71 may be applied in a manner making a circuit, similarly to the double-sided adhesive tape 70. The application of the adhesive 71 is not limited inside the double-sided adhesive tape 70 but may be outside the double-sided adhesive tape 70. When the electronic apparatus is desired to have a waterproof structure, the double-sided adhesive tape 70 may have a waterproofing function. When the adhesive 71 is applied in the manner making a circuit, the double-sided adhesive tape 70 does not need to have the waterproofing function but preferably arranged inside the adhesive 71.

The double-sided adhesive tape 70 is made up of, for example, a polyethylene substrate having a fine closed cell structure and an acrylic adhesive laminated on both sides of the polyethylene substrate. A foam-containing double-sided adhesive tape is made up of, for example, a PET substrate or a polyester substrate and the acrylic adhesive laminated on both sides thereof. The joint member is not limited to the double-sided adhesive tape 70 but may be, for example, a moisture-curing elastic adhesive which is cured by reacting with moisture in the air (humidity). Such a moisture-curing elastic adhesive contains a special polymer containing, for example, a silyl group as a main component. The adhesive 71 is, for example, a UV-curable acrylic resin.

The housing 60, along the lateral direction thereof, is provided with a rib 61 protruding toward the panel 10. In other words, the rib 61 is provided in a manner extending in the lateral direction of the housing 60. The rib 61 is provided in such a manner separating inside the housing 60 into a space in which the piezoelectric element 30 is disposed and a space in which the display unit 20 is disposed.

The panel 10 is not attached to the rib 61 in its entirety. More specifically, in a region of the panel 10 facing the rib 61, both ends of the panel 10 along the lateral direction thereof are attached to the rib 61 by the joint member (the double-sided adhesive tape 70). In the region of the panel 10 facing the rib 61, a region on a longitudinal side with respect to the mounting region for mounting the piezoelectric element 30 close to the display unit 20 is not attached to the rib 61.

According to the electronic apparatus 1 of the present embodiment, as described above, since the piezoelectric element 30 is arranged on the rear surface of the panel 10 inside the housing 60, i.e., since the piezoelectric element 30 is not exposed to the outside, portability may be improved. The panel 10 sufficiently vibrates from one end thereof in the longitudinal direction having the piezoelectric element 30 attached thereto to the vicinity of a central portion. Therefore, the user, by bringing at least a portion of a range from the central portion of the panel 10 to the top into contact with a part of the user's body (for example, the external ear cartilage), may hear the air conduction sound and the vibration sound generated by the vibration of the panel 10. Accordingly, the user may use the electronic apparatus 1 in any position, which may improve usability. Since the vibration at the bottom of the panel 10 is reduced, sound leakage may be reduced. A distribution of the vibration of the panel 10 caused by the piezoelectric element 30 may be adjusted by changing an attachment area or an attachment position of the panel 10 to the rib 61. Therefore, the panel 10 may be completely spaced apart from the rib 61.

According to the present embodiment, the double-sided adhesive tape 70 for attaching the piezoelectric element 30 is not provided inside (in a central region of) the panel 10 from the mounting region for mounting the piezoelectric element 30. Therefore, the vibration of the piezoelectric element 30 mounted in the vicinity of one end in the longitudinal direction of the panel 10 does not become attenuated when travelling toward the other end in the longitudinal direction of the panel 10.

Between the panel 10 and the display unit 20, for the purpose of preventing dust and the like, a dustproof member 72 made of the double-sided adhesive tape or the adhesive is provided in the manner making the circuit along the periphery of the display unit 20.

The dustproof member 72 is provided for the purpose of preventing dust from entering a gap between the panel 10 and the display unit 20. Therefore, in the gap between the panel 10 and the display unit 20, the dustproof member 72 is provided in the manner making the circuit along the periphery of the display unit 20. Although a sponge has been conventionally used as the dustproof member, we have revealed that using the sponge increases a distortion factor as acoustic properties. Therefore, in order to reduce the distortion factor, the double-sided adhesive tape or the adhesive are preferred rather than the sponge.

Figure 4:
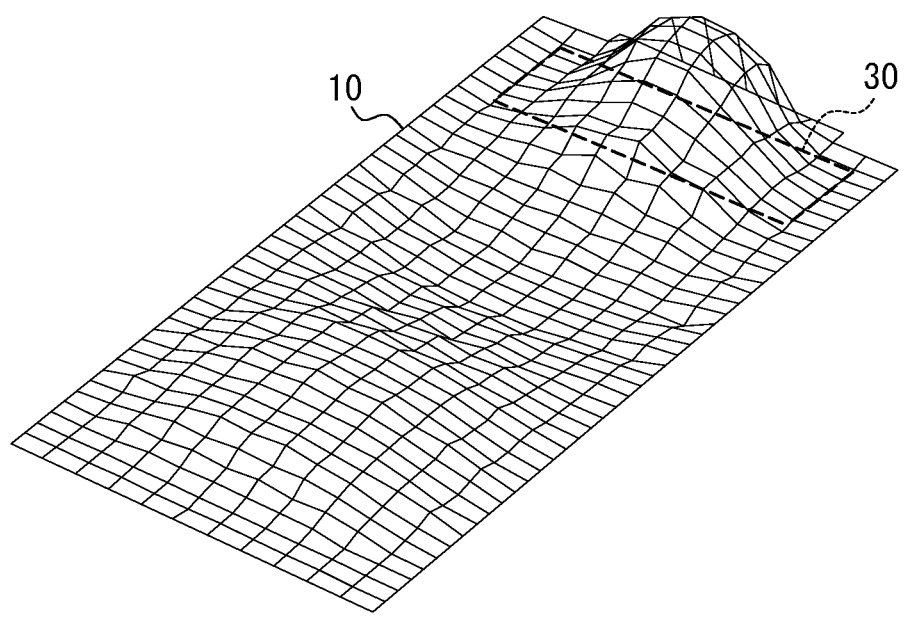
FIG. 4 is a diagram illustrating an example of vibration of a panel of the electronic apparatus according to one embodiment.

FIG. 4 is a diagram illustrating an example of the vibration of the panel 10 of the electronic apparatus 1. In the electronic apparatus 1, the display unit 20 is partially (along the periphery thereof alone) attached to the rear surface of the panel 10. Therefore, as compared with the display unit 20 entirely attached to the panel 10, amplitude generated by the piezoelectric element 30 becomes greater.

Figure 5:
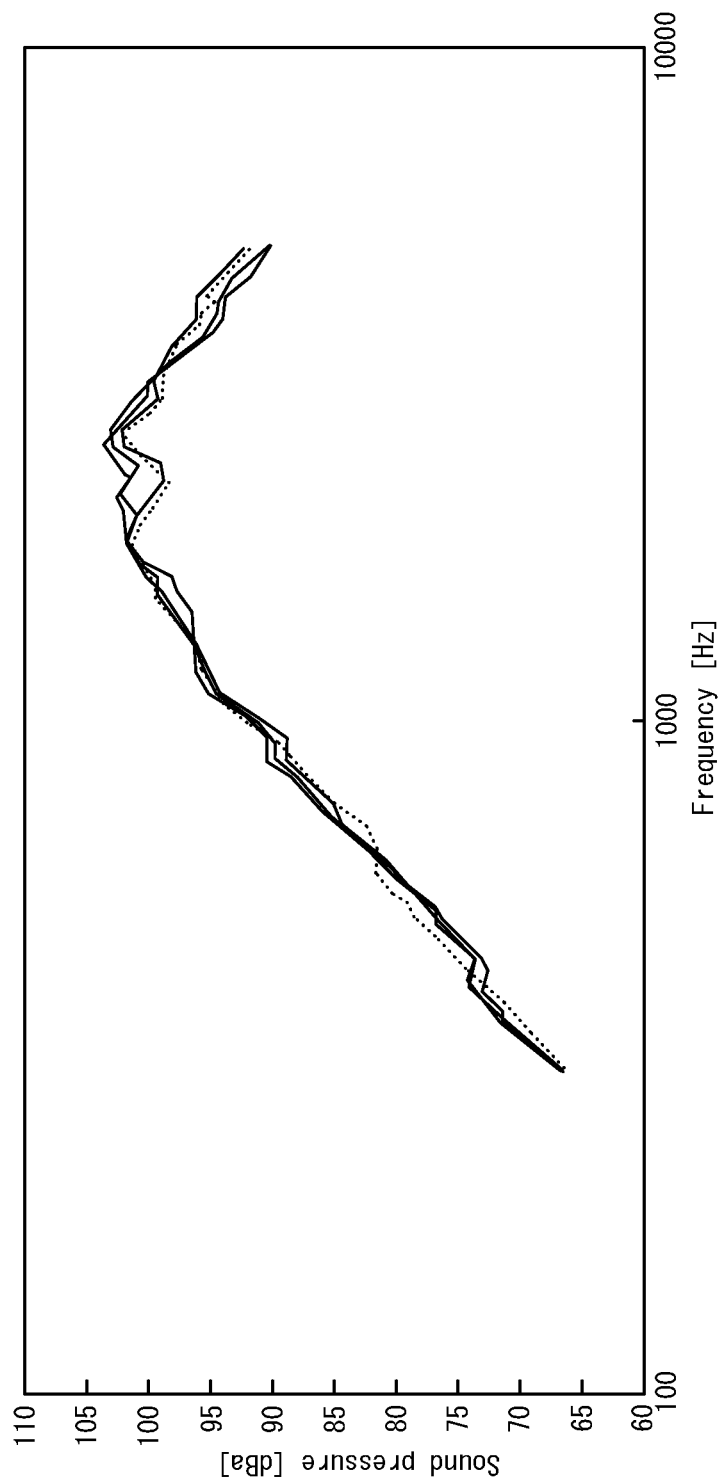
FIG. 5 is a frequency characteristic diagram of the panel of the electronic apparatus according to one embodiment.
Figure 6:
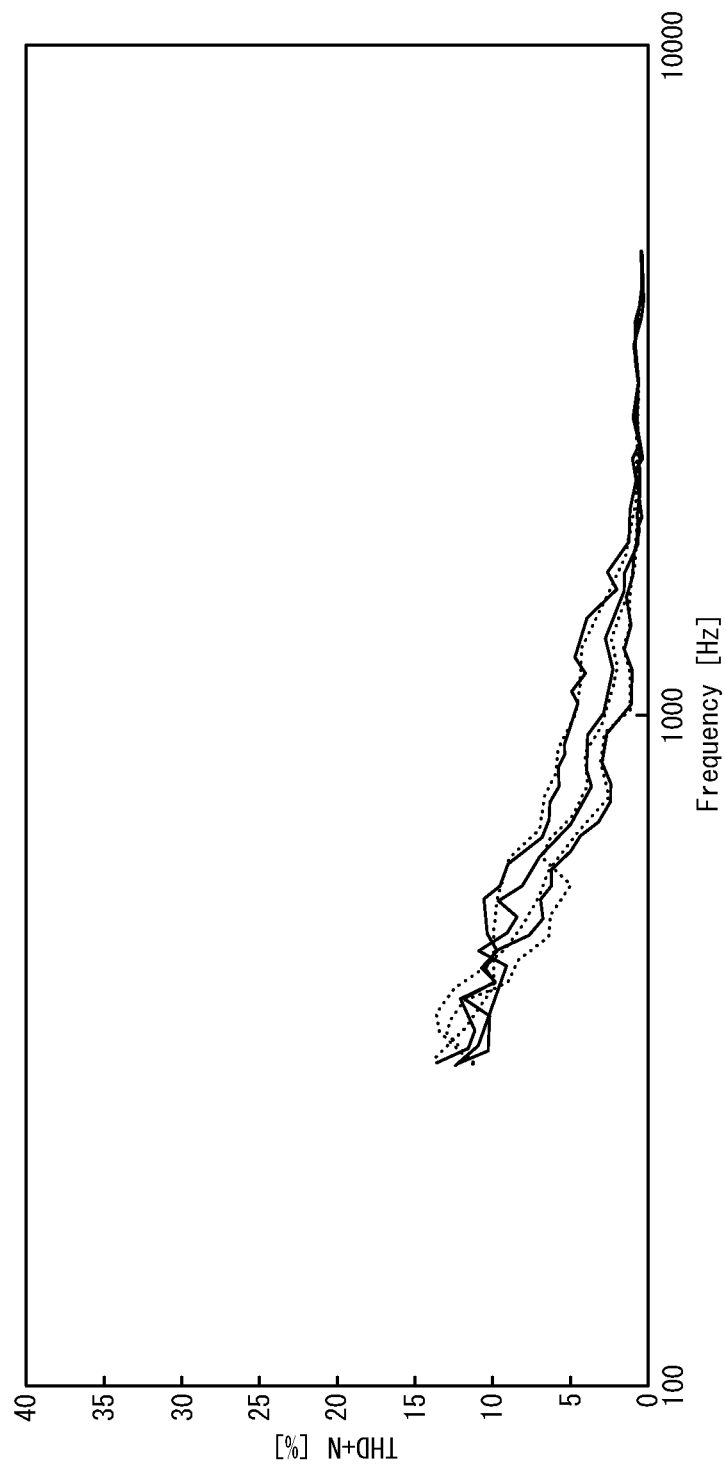
FIG. 6 is a diagram illustrating a distortion function of the electronic apparatus according to one embodiment.

This effect will be described with reference to FIG. 5 and FIG. 6. FIG. 5 is a frequency characteristic diagram illustrating a relation between a frequency of a sound signal and an output sound pressure level. The output sound pressure level refers to an output of an acoustic measuring apparatus (HATS: Head And Torso Simulator). FIG. 6 is a diagram illustrating the distortion factor. Although the electronic apparatus 1 may obtain, for example, an output over 90 dB at the frequency of 1 kHz, the distortion factor is suppressed to 5% or less.

Although the present disclosure has been described based on the figures and the embodiment, it is to be understood that various changes and modifications may be implemented based on the present disclosure by those who are ordinarily skilled in the art. Accordingly, such changes and modifications are included in the scope of the disclosure herein. For example, functions and the like included in each unit, each step and the like may be rearranged without logical inconsistency, so as to combine a plurality of components or steps together or to divide them.

For example, after attaching the reinforcing member to the piezoelectric element 30, a piezoelectric element unit composed of a piezoelectric element complex may be attached to the panel 10. Thereby, upon application of undesired external force to the panel 10, there is less possibility for the external force to be delivered to and damaging the piezoelectric element 30.

REFERENCE SIGNS LIST 1 electronic apparatus
5 radio communication unit
10 panel
20 display unit
30 piezoelectric element
40 input unit
41 mouthpiece
50 controller
60 housing
61 rib
70 double-sided adhesive tape (joint member)
71 adhesive
72 dustproof member

The invention claimed is:

1. An electronic apparatus having a panel, a housing for supporting the panel, and a piezoelectric element unit attached to the panel, the panel becomes bent by the piezoelectric element unit in such a manner that a region of the panel immediately above the piezoelectric element unit in a longitudinal direction thereof is raised higher than a surrounding region, and thus a part of the human body in contact with the panel vibrates and delivers a sound, wherein
the panel is attached to the housing by a double-sided adhesive tape provided along a periphery of the panel and an adhesive applied along the double-sided adhesive tape.

2. The electronic apparatus according to claim 1, wherein the double-sided adhesive tape surrounds a mounting region of the piezoelectric element unit and makes a circuit along the periphery of the panel.

3. The electronic apparatus according to claim 1, wherein the piezoelectric element unit is disposed at one end of the panel, and the adhesive extends from the one end to the other end.

4. The electronic apparatus according to claim 1, wherein a display unit is disposed inside the housing, and
a dustproof member is arranged on a periphery of the display unit between the display unit and the panel.

5. The electronic apparatus according to claim 4, wherein the dustproof member is the double-sided adhesive tape or the adhesive for attaching the display unit and the panel together.

6. The electronic apparatus according to claim 4, wherein neither the adhesive nor the double-sided adhesive tape for attaching the housing and the panel together is arranged in a region between the piezoelectric element and the display unit.

* * * * *